US008516064B2

(12) United States Patent
Steele (10) Patent No.: US 8,516,064 B2
(45) Date of Patent: *Aug. 20, 2013

(54) SYSTEM AND METHOD FOR RESTRICTING ACCESS TO EMAIL AND ATTACHMENTS (75) Inventor: Charles R. Steele, McKinney, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/165,477

(22) Filed: Jun. 21, 2011

(65) Prior Publication Data
US 2011/0252109 A1  Oct. 13, 2011

Related U.S. Application Data (63) Continuation of application No. 10/878,980, filed on Jun. 28, 2004, now Pat. No. 7,966,375.

(51) Int. Cl.
G06F 13/00  (2006.01)

(52) U.S. Cl.
USPC ............................................ 709/206; 709/229

(58) Field of Classification Search
USPC ................... 709/229, 204–206; 726/22–27, 726/30
See application file for complete search history.

(56) References Cited

U.S. PATENT DOCUMENTS

| 5,781,901 A | 7/1998 | Kuzma |
| 5,903,723 A | 5/1999 | Beck et al. |
| 7,017,187 B1 | 3/2006 | Marshall et al. |
| 7,113,948 B2 * | 9/2006 | Jhingan et al. ........................ 1/1 |
| 7,209,953 B2 | 4/2007 | Brooks |
| 7,320,019 B2 * | 1/2008 | Malik ............................ 709/206 |
| 7,469,050 B2 | 12/2008 | Kouznetsov et al. |
| 7,512,798 B2 | 3/2009 | Cahill et al. |
| 7,549,062 B2 | 6/2009 | Kouznetsov et al. |
| 7,660,989 B2 | 2/2010 | Tomkow |
| 7,966,375 B2 | 6/2011 | Steele |
| 2002/0065891 A1 * | 5/2002 | Malik ............................ 709/206 |
| 2003/0200267 A1 * | 10/2003 | Garrigues ..................... 709/206 |
| 2003/0236847 A1 * | 12/2003 | Benowitz et al. ............. 709/206 |
| 2004/0117456 A1 | 6/2004 | Brooks |
| 2004/0186851 A1 * | 9/2004 | Jhingan et al. .............. 707/104.1 |
| 2004/0186895 A1 | 9/2004 | Ellis |
| 2004/0221014 A1 | 11/2004 | Tomkow |
| 2005/0005166 A1 | 1/2005 | Kouznetsov et al. |
| 2005/0015457 A1 | 1/2005 | Warasawa |
| 2005/0262566 A1 | 11/2005 | Gassoway |
| 2005/0289221 A1 | 12/2005 | Steele |
| 2007/0118903 A1 | 5/2007 | Bates et al. |

OTHER PUBLICATIONS

Robertson, P.D., "Don't Get Too Attached," pp. 2 (Aug. 2001).
GoodmailSystemsTM, Restoring Trust in e-mailTM, GoodmailTM Certified Email, pp. 2 (2005).

(Continued)

Primary Examiner — Kenneth R Coulter (57) ABSTRACT

One aspect of the invention is a method for restricting access to one or more email attachments includes receiving an email addressed to a first recipient and including at least a first attachment. The email is processed to determine whether a valid authorization code is associated with the email (and/or the attachment(s)). The valid authorization code identifies the email (and/or the attachment(s)) as an authorized communication. Access by the recipient to the first attachment is prevented if the processing of the email determined that no valid authorization code is associated with the email (and/or the attachment(s)).

23 Claims, 3 Drawing Sheets (56) References Cited

OTHER PUBLICATIONS

The Office Action for U.S. Appl. No. 10/878,980 mailed Mar. 7, 2008 (12 pages).
The Final Office Action for U.S. Appl. No. 10/878,980 mailed Dec. 26, 2008 (10 pages).
The Office Action for U.S. Appl. No. 10/878,980 mailed Sep. 2, 2009 (13 pages).
The Office Action for U.S. Appl. No. 10/878,980 mailed Feb. 22, 2010 (12 pages).
The Final Office Action for U.S. Appl. No. 10/878,980 mailed Aug. 5, 2010 (12 pages).
The Notice of Allowance for U.S. Appl. No. 10/878,980 mailed Mar. 4, 2011 (13 pages).

* cited by examiner

SYSTEM AND METHOD FOR RESTRICTING ACCESS TO EMAIL AND ATTACHMENTS

CROSS REFERENCE TO RELATED APPLICATIONS

This application is a continuation of U.S. application Ser. No. 10/878,980, now U.S. Pat. No. 7,966,375, filed Jun. 28, 2004, which is herein incorporated by reference.

TECHNICAL FIELD OF THE INVENTION

This invention relates generally to network communications systems and more particularly to a system and method for restricting access to email and attachments.

BACKGROUND

Because of the increasing number of malicious worms hidden inside electronic mail (email) attachments, computer networks typically operate in a restricted mode. For example, a gateway server within a computer network may control access to the computer network from a public network or other private networks. The gateway server may be used to block emails that include attachments with particular file types. The emails that are blocked generally include those types of attachments that are identified as potentially transporting and hiding malicious code (Mal-Ware) or internet based worms or viruses. For example, a computer network may operate to automatically block all emails that include .exe, .scr, .pif, zip files, or other executable attachments and files. The blocking of the emails prevents the malicious files from being executed or opened, which in turn prevents the activation of the worm or virus.

In the restricted mode, the gateway server may operate to block, or quarantine, emails with such types of attachments when entering or leaving the computer network. In some cases, neither the email nor the attachment is ever received by the desired recipient. In other cases, the gateway server may strip the email of the attachment before sending the email to the desired recipient. While some of the attachments may contain viruses, others may contain legitimate business-related software or data. Thus, conventional modes of restricting email attachments simply by stripping all files of a certain type, may impede the communication of genuine business or other legitimate email.

For these and other reasons, a need exists for the present invention.

SUMMARY OF THE INVENTION

One aspect of the invention is a method for restricting access to one or more email attachments includes receiving an email addressed to a first recipient and including at least a first attachment. The email is processed to determine whether a valid authorization code is associated with the email (and/or the attachment(s)). The valid authorization code identifies the email (and/or the attachment(s)) as an authorized communication. Access by the recipient to the first attachment is prevented if the processing of the email determined that no valid authorization code is associated with the email (and/or the attachment(s)).

The invention has several important technical advantages. Various embodiments of the invention may have none, one, some, or all of these advantages without departing from the scope of the invention. The invention allows for the association of a valid authorization code with emails and/or attachments transmitted to or within an enterprise network. In particular embodiments, the valid authorization code may include a string of numbers, letters, symbols, or a combination thereof that indicate to the enterprise network that the emailed communication is a valid and authorized communication. Accordingly, the invention may allow an enterprise network, the user's mail client, or other software and/or hardware to restrict access to email on a case-by-case basis. The validity of each email may be determined based on verification of the valid authorization code included in the email (or attachment) rather than based solely upon the type of attachment or the filename assigned to the attachment. As a result, the invention may enable more legitimate business email to be communicated without interference, while providing protection against worms and viruses.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The preferred embodiment of the present invention and its advantages are best understood by referring to FIGS. 1-4 of the drawings, like numerals being used for like and corresponding parts of the various drawings.

Figure 1:
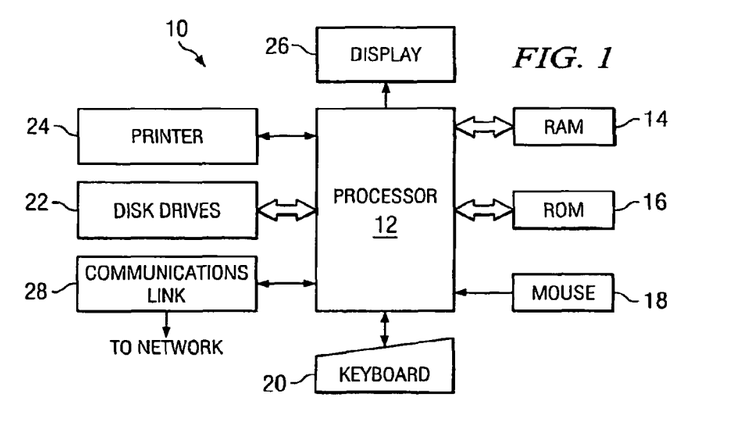
FIG. 1 illustrates a block diagram of a general purpose computer that may be used in accordance with the present invention.

FIG. 1 illustrates a general purpose computer 10 that may be used for restricting access to a file attached to an electronic mail communication (email) or to the email itself in accordance with the present invention. In certain embodiments, general purpose computer 10 may comprise a portion of an enterprise network and may be used to execute applications and software to access various components of the enterprise network. In certain embodiments, general purpose computer 10 may comprise a computer external to an enterprise network that operates to communicate with one or more computers in the enterprise network. General purpose computer 10 may be adapted to execute any of the well known MS-DOS, PC-DOS, OS2, UNIX, MAC-OS and Windows operating systems or other operating system. As used in this document, operating system may refer to the local operating system for computer 10, a network operating system, or a combination of both. In some embodiments, the network operating system, local computer operating system, and/or the email client may act in concert to restrict access to one or more emails or email attachments.

General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drive 22 may include a variety of types of storage media such as, for example, floppy disk drives, hard disk drives, CD ROM drives, or magnetic tape drives. Disk drive 22 may also include a network disk housed in a server within the enterprise network. Although this embodiment employs a plurality of disk drives 22, a single disk drive 22 could be used without departing from the scope of the invention. FIG. 1 only provides one example of a computer that may be used with the invention. The invention could be used with computers other than general purpose computers as well as general purpose computers without conventional operating systems.

Figure 2:
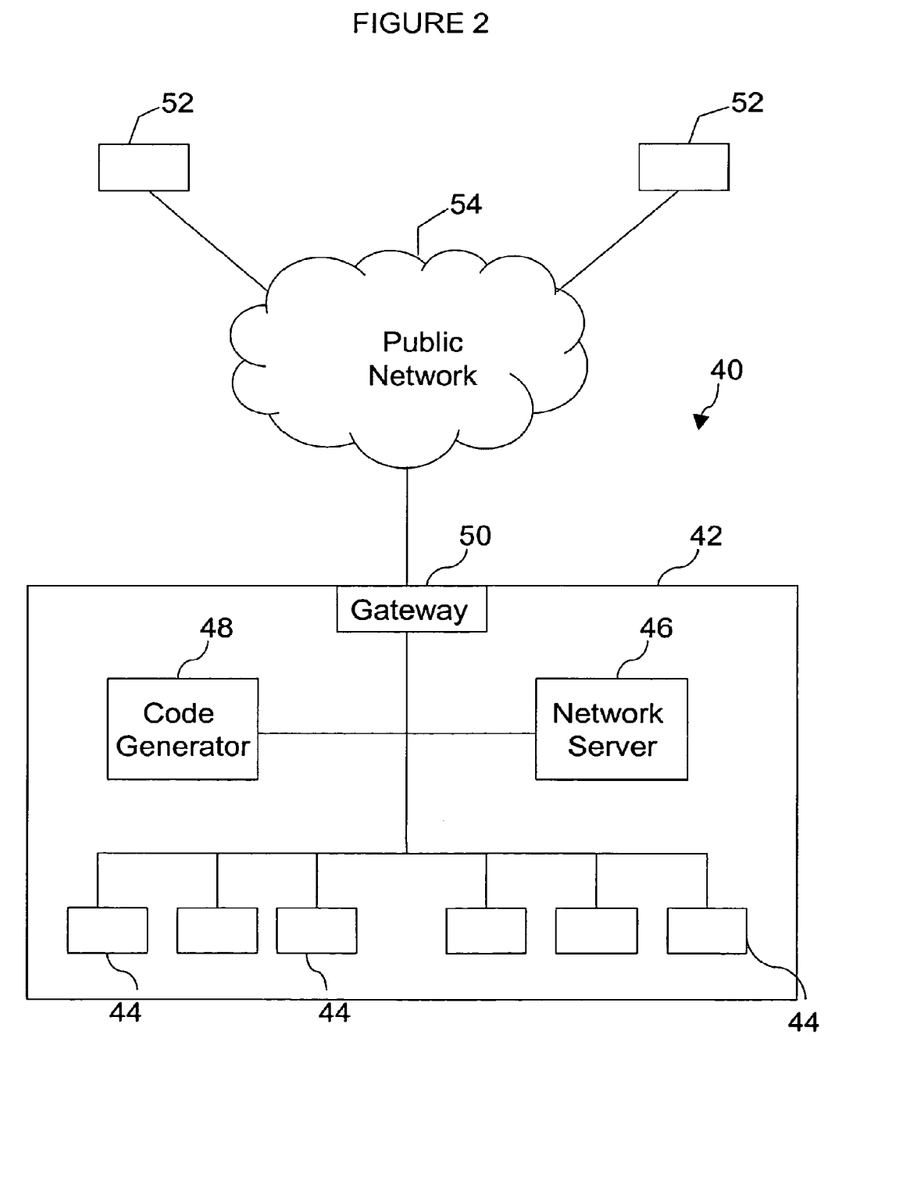
FIG. 2 illustrates a block diagram of an example system that may be used for restricting user access to an email or attachment in accordance with the present invention.

FIG. 2 illustrates an example email system 40 that includes elements that may cooperate to restrict access to one or more email messages or attachments in accordance with the present invention. Email system 40 operates to identify those emails and/or attachments that are valid and can provide various functionality for others. As will be described below, an authorization code may be appended to or otherwise associated with the email or attachment such that a component within email system 40 may readily identify the valid authorization code when an email is received by email system 40. When an email (or attachment) that does not include a valid authorization code is received, email system 40 may prevent recipients of the email from accessing the invalid email and/or attachment. Because a determination is made as to the validity of email messages and/or attachments on a case-by-case basis, email system 40 may prevent recipients of an invalid email from accessing those emails and/or attachments that are identified as invalid.

Email system 40 may include an enterprise network 42. In the illustrated example, enterprise network 42 comprises at least one enterprise computer 44, a network server 46, a code generator 48, and an electronic mail gateway server 50. Enterprise network 42 may have, however, more or less components of these or differing types without departing from the scope of the invention. Additionally, while network server 46, code generator 48, and electronic mail gateway server 50 are illustrated as separate components, some or all of the functions of these components could be combined. Furthermore, the functionality that is described below for restricting access to email attachments may reside in any one or combination of the illustrated components.

The one or more enterprise computers 44 within enterprise network 42 may be configured substantially like computer 10 described above with regard to FIG. 1 or may include any general purpose computer. Enterprise computers 44 may include email applications stored on enterprise computers 44 or another component within enterprise network 42 that enable enterprise computers 44 to send and receive email. The email application may enable each enterprise computer 44 to send email to and receive email from any other enterprise computer 44 within enterprise network 42. Additionally or alternatively, the email application may enable enterprise computers 44 to send email to and receive email from one or more computers 52 external to enterprise network 52.

External computers 52 may also be configured substantially like computer 10 described above with regard to FIG. 1 or may include any other general purpose computer. For communication with other external computers 52 and enterprise computers 44, each external computer 52 may include an email application stored on external computer 52. In various embodiments, an external computer 52 may include any computer that is external to enterprise network 42. External computer 52 may include a stand-alone computer operating independently of any network. Alternatively, external computer 52 may reside within and operate in cooperation with a business network that is also external to and independent of enterprise network 42. In such an embodiment, the email application associated with external computer 52 may be stored directly on external computer 52 or on any other component of the business network. The email application may enable external computer 52 to communicate with enterprise computers 44 and other external computers 52 inside and outside of the business network.

Emails communicated between external computers 52 and enterprise computers 44 may be transmitted over a public network 54, such as the Internet. Emails communicated between two or more enterprise computers 44 within enterprise network 42 may be transmitted over an Intranet or Extranet maintained by enterprise network 42. Electronic mail gateway server 50 may manage email communications communicated to and within enterprise network 42. For example, an email communicated from an external computer 52 to an enterprise computer 44 may be communicated through gateway server 50. Additionally, an email communicated from a particular enterprise computer 44 to another enterprise computer 44 may be communicated through gateway server 50, which may also operate to control the traffic flow of data between enterprise components. Alternatively, gateway server 50 may be configured to only handle external email communications. Additional email servers could be included or the gateway server excluded without departing from the scope of the invention. Gateway server 50 may be configured substantially like computer 10 described above with regard to FIG. 1. Alternatively, gateway server 50 may include any general purpose computer with the appropriate applications and functionality for managing the communication of emails traversing enterprise network 42. If gateway server 50 is excluded, its functions could be handled by other servers or clients within enterprise network 42. The invention could be used to authorize emails generated outside enterprise network 42, inside enterprise network 42, or both.

As described above, an authorization code may be associated with an email (including in an attachment) to identify the email as an authorized communication. The authorization code may include a series of letters, numbers, numeric data, and/or symbols that indicate to various components of enterprise network 42 that the email communication is authorized. As just one example, an authorization code might include the string such as "GF17" and may be stored within or appended to various portions of the email (and/or attachment(s)). When a component within email system 40 receives an email that is not associated with a valid authorization code, email system 40 may prevent addressed recipients from accessing the unauthorized email and/or any attachments appended to the unauthorized email.

In particular embodiments, the authorization code may be associated with and particular to the enterprise network 42. Thus, where communications are anticipated between enterprise computers 44, enterprise network 42 may make the authorization code available to enterprise computers 44 or users of enterprise computers 44. Additionally, where communications are anticipated between external computers 52 and enterprise computers 44, enterprise network 42 may also make the valid authorization code available to external computers 52 or users of external computers 52. The code could also be supplied in writing or orally by users of computers 44.

Accordingly, email communicated to or from enterprise computers 44 may include a common valid authorization code regardless of the sender or recipient of the email. Enterprise network 42 may process email that is received within enterprise network 42 to identify whether a valid authorization code is associated with the email. As will be described in more detail below, email received at enterprise network 42 that does not include the valid authorization code associated with enterprise network 42 may be treated differently than email received that does include the valid authorization code. Accordingly, enterprise network 42 can verify, control, and manage email traffic transmitted to, from, and within enterprise network 42.

In other embodiments, the authorization code may be associated with and particular to the recipient of the email. Thus, each recipient (or a specific group of recipients) within enterprise network 42 may have their own unique authorization code that may be used to validate email addressed to each recipient (or each group). In particular embodiments, the authorization code may be associated with the email address of the recipient. When an email is received at enterprise network 42 or communicated within enterprise network 42, enterprise network 42 may process the email to determine if the email includes an authorization code that is associated with the addressed recipient. Because enterprise network 42 may include many possible recipients of email, enterprise network 42 may maintain a registry of valid authorization codes. Accordingly, enterprise network 42 may compare the authorization code identified in the email to the registry of valid authorization codes to determine if the authorization code in the email is a valid one. Where the email includes a valid authorization code, the email may be deemed an authorized communication and may be forwarded on or otherwise made available (as the comparison could occur at the recipient's computer) to the addressed recipient. In the described embodiment, it is contemplated that an email transmitted to or within enterprise network 42 may include multiple valid authorization codes since a single email may be addressed to multiple recipients within enterprise network 42 or multiple recipients who may be outside enterprise network 42. Accordingly, enterprise network 42 may process the email to determine whether the email includes a valid authorization code for each addressed recipient (or a subset thereof) before making the email available to the addressed recipients. If a valid code is present as to some but not all recipients, the email could be sent to authorized recipients and handled in the ways described herein as to unauthorized recipients. Alternatively, one valid authorization might allow sending to all recipients.

In still other embodiments, the valid authorization code may be associated with and particular to the sender of the email. Thus, persons, entities, or computers authorized to send email communications from or to an enterprise computer 44 may be assigned a valid authorization code that is specific to that person, entity, or computer. For example, in particular embodiments, the valid authorization code may be associated with the email address of the sender. In other embodiments, the valid authorization code may be associated with and particular to a business entity (or subdivision thereof) associated with the particular sender. When an email is received at enterprise network 42 or otherwise communicated within enterprise network 42, enterprise network 42 may process the email to determine if the email includes an authorization code that is associated with the sender. When such an authorization code is found, enterprise network 42 may compare the authorization code identified in the email to the registry of valid authorization codes to determine if the authorization code included in the email is a valid one. Where the authorization code is a valid one, the email may be forwarded on to or otherwise made available to the addressed recipient. Any of the above options can be combined. For example, an email could include both a sender and recipient authorization code.

Another application of sender authorization code could involve the use of gateway server 50 or an email client on a computer 44 to prevent an email generated within network 42 or a computer 44 from being transmitted any further. Worms often access email lists of recipients and spread the worm by mass mailing to every email address on the list. If the email client on a computer 44 required an authorization code, then this type of spreading would be more difficult especially if the authorization code needed to be manually entered an/or changed periodically. A similar check at the gateway server 50 may prevent worms from spreading in a similar manner to recipients outside network 42.

Depending on the particular embodiment implemented, the authorization code may be located within or otherwise associated with either the email itself or with an attachment to the email. Where the authorization code is associated with the email itself, the authorization code may be stored in the header of the email, the subject line of the email, the body of the email, or in any other field or with any data associated with the email, including system portions not accessible to users. A specific field might be specified or, in some embodiments, the code could be placed in any part of the email. For example, if "GF17" is an authorization code associated with enterprise network 42, gateway server 50 may be configured to process an email received at gateway server 50 to determine whether the email includes "GF17" stored in the appropriate place in the email. Accordingly, gateway server 50 may operate to search one or all of the header, the subject line, or the body of the email for the valid authorization code, "GF17." Thus, a person desiring to send an email from an external computer 52 and/or enterprise computer 44 (in some embodiments) may type "GF17" in the subject line of the email when creating the email. Alternatively, "GF17" may be appended to the email address of the desired recipient, or "GF17" may be typed in the body of the email.

In other embodiments, the authorization code may be associated with an attachment appended to the email. For example, "GF17" may be inserted in the file name of the attachment. When the email is received, gateway server 50 or the email application processing the email (such as an email client or one of computers 44) may search for the authorization code in the filename of the attachment. In particular embodiments, gateway server 50 or the email application processing the email may be configured to search for the valid authorization code in particular locations within the filename. For example, the authorization code may only be valid if the authorization code is located at the beginning of the filename. Therefore, a person desiring to send an email to an enterprise computer 44 may insert the valid authorization code at the beginning of the file name of the attachment. As one example, an authorized communication may include an email with an attachment named "GF17attachment.doc" or "GF17.attachment.doc". In other embodiments, gateway server 50 or the email application processing the email may operate to identify the valid authorization code at any position within the file name. For example, an authorized communication may include an email with an attachment named "attachGF17ment.doc", "attachmentGF17.doc", or "attachment.GF17.doc".

In still other embodiments, the valid authorization code may be embedded within metadata associated with either the email, the attachment, or both. The metadata associated with an email may include information about how, when, and by whom the email was created. The metadata may also include information about how the content of the email is formatted. The metadata associated with an attachment may also contain information about how, when, and by whom the attachment was created. Metadata may or may not be visible to the sender or recipient of an email. Because the authorization code may be embedded within the metadata associated with either the email, the attachment, or both, the present invention contemplates that the use of the authorization code may be transparent to both the sender and the recipient of the email in particular embodiments. Regardless of where the authorization code is included, its absence may be used to restrict access to an email, an attachment, or both.

The association of the authorization code with the email or the attachment may be performed manually, as described above, or mechanically by the components of email system 40. Thus, as described above, a user may manually inject the valid authorization code into the email by typing it into the subject line or the body of the email or by inserting the valid authorization code into the file name of the attachment. In alternative embodiments, however, the functionality for associating the valid authorization code with the email may reside in the email application used to create the email (or in an application used to create an attachment). For example, the user of the email application may select to append the attachment to the email in the usual manner. The user may then use a tool provided by the email application (or that operates with it) to insert the authorization code into the appropriate field of the email or attachment. As another option, the email application (or companion tool) may be configured to automatically insert the authorization code into the appropriate field of the email or attachment. Depending on the particular embodiment implemented, the association of the authorization code with the email may or may not be transparent to the user of the email application.

As described above, enterprise network 42 may make the authorization code available to persons, entities, or devices who may desire to communicate with enterprise computers 44. To this end, code generator 48 may operate to randomly generate and periodically update authorization codes that may be used by enterprise network 42 to control and manage email traffic within enterprise network 42. The authorization codes may be stored on network server 46 within enterprise network 42. To provide the authorization code to potential senders of authorized email communications, network server 46 may be made accessible to enterprise computers 44 and/or external computers 52 or users of these computers. Accordingly, when a user of an enterprise computer 44 or an external computer 52 desires to transmit an email to one or more enterprise computers 44, the user may visit a website stored on network server 46 to obtain the authorization code. The website may be password protected or include some other security measure to enable the selective distribution of the authorization code to authorized users. In alternative embodiments, enterprise network 42 may email the authorization code to the potential senders of authorized email communications. Thus, enterprise network 42 may limit the access to or distribution of the authorization code to only those users who have a legitimate business interest in sending an email to an enterprise computer 44.

In the case of networks operated by business associates of the operator of enterprise network 42 having secure connections thereto or in the case of an enterprise network 42 with multiple gateway servers, authorization codes may be broadcast (synchronized) when updated to other gateway servers and networks, these updates may occur using techniques commonly used for database updates and other similar applications.

An authorization code associated with enterprise network 42 may be periodically changed to maintain security. For example, a current authorization code may be immediately replaced with a new authorization code in response to the current authorization code being compromised. Thus, where the authorization code is stored on network server 46, network server 46 may be periodically updated with a new authorization code. Where network server 46 is selectively accessible to potential senders of email, however, those with access rights to network server 46 may immediately access the new authorization code. Where the authorization code is changed as a part of a general routine adopted by enterprise network 42 to safeguard access to enterprise network 42 and not because of a compromise of the previous authorization code, it may be desirable to allow both the previous and new authorization codes to be used simultaneously for a short period of time while authorized users of email system 40 are notified that a new authorization code is in place.

Although the user creating an email, in some embodiments, may manually obtain the valid authorization code from network server 46, as described above, the present invention also contemplates that in certain embodiments the email application used to create the email may also be used to append or insert the authorization code into the email or the attachment. For example, the email application may include a tool for the insertion of the authorization code into the email or the attachment. The tool may be similar to that which allows a user of the email application to append an attachment to an email. Thus, the insertion of the valid authorization code may be performed by using a integrated into the email application itself (or that works therewith), and may or may not be performed simultaneously with the appending of the attachment. In other embodiments, after appending the attachment to the email, the user may right click on the attachment and be given an option that allows the user to select to insert the authorization code into the appropriate field of the email or the attachment.

In particular embodiments, the enterprise computer 44 may be a part of an enterprise wide distribution scheme to continuously deploy the current authorized code to all network devices that require it, including network servers and all end users PC's and devices. This scheme would be very similar to a common scheme used in distributing virus signature files in enterprises currently using a hub and spoke method of distribution. This embodiment would make available the current authorized code on enterprise devices consistently for the use in modifying the emails or attachments. As such, in this embodiment, the user may not need to know the particular valid authorization code and may not even need to know of the existence or use of such a code by email system 40.

In particular embodiments, the email application may also operate to identify when an authorization code is needed and obtain the authorization code from network server 46. For example, when creating an email or when appending an attachment to an email, the email application used to create the email may determine whether an authorization code is necessary to create a valid communication to an enterprise computer 44 within enterprise network 46. Thus, the email application may send a message to network server 46 requesting the authorization code. Alternatively, the email application may include a tool suitable for searching network server 46 to determine whether an authorization code is stored on network server 46. Because such determinations can be made without the input of the user, the functionality of obtaining the authorization code to create an authorized email may be performed in a manner that is transparent to the user. As such, the user need not know what the particular valid authorization code is for enterprise network 42 and may not even know of the existence or use of such a code by email system 40.

As described above, an authorization code appended or otherwise associated with an email may indicate to enterprise network 42 that the email is an authorized communication. Accordingly, when receiving an email transmitted to or within enterprise network 42, enterprise network 42 may process the email to determine whether a valid authorization code is associated with the email. Because gateway server 50 may operate to manage email traffic within enterprise network 42, all email whether generated inside or outside enterprise network 42 may be communicated through gateway server 50 for routing to the particular enterprise computer 44 associated with the addressed recipient. As such, gateway server 50 may process each email transmitted to or within enterprise network 42 to identify whether a valid authorization code is associated with the email before routing the email to the addressed recipient. Alternatively, gateway server 50 may only authorize external emails. In another embodiment, it may only authorize internal emails. As noted above, other email servers or multiple gateway servers could also perform authorization.

In particular embodiments, the authorization code may identify to gateway server 50 that an attachment appended to the email is an authorized communication. As a result, gateway server 50 may assume that the email is not a worm or other destructive communication sent to corrupt enterprise network 42. Where the email lacks the valid authorization code, however, gateway server 50 may assume that the communication is potentially harmful and restrict recipient access to the email and/or attachment. For example, gateway server 50 may strip the attachment from the email before forwarding the stripped email to the addressed recipient. Thus, only the attachment may be prevented from leaving gateway server 50. The recipient may then access the remaining portions of the email. As another example, gateway server 50 may put a block on the attachment which will prevent the recipient from opening an attachment. For the purposes of this document, opening the attachment includes executing an executable. This manner of restriction, again, merely prevents the recipient from accessing the attachment. The rest of the emailed communication may be accessible to the recipient. In other embodiments, however, gateway server 50 may quarantine the email with the attachment, and the recipient may be prevented from accessing both the email and the attachment without permission. The entire email could also be destroyed.

In other embodiments, the authorization code may identify to gateway server 50 that the email itself is an authorized communication. As a result, gateway server 50 may assume that the email is not a worm or other destructive communication sent to corrupt enterprise network 42. Where the email lacks the authorization code, however, gateway server 50 may assume that the communication is potentially harmful and restrict recipient access to the email. For example, gateway server 50 may quarantine the email such that the recipient is prevented from accessing the email altogether without special permission. The email might also be destroyed. In embodiments where the gateway server 50 is unable to locate the valid authorization code within an appropriate field of the email, the email may be prevented from leaving gateway server 50 or an email client. Such actions could occur either when an email is leaving or entering either gateway server 50 or an email client.

Where access to the email, the attachment, or both is prevented because an email is received without a valid authorization code, neither the sender nor the recipient may be aware that the communication has partially or totally failed. In certain embodiments, however, gateway server 50, the email client, or another server may notify the sender and/or the recipient that the email communication has partially or totally failed. Accordingly, gateway server 50 may generate a response message conveying to the sender of the email that the sender has sent an unauthorized communication to the enterprise network. Where appropriate, the response message may also notify the sender that the original email has been quarantined or that the recipient received only a portion of the original email. The response message may further describe to the sender the steps required to obtain a valid authorization code.

Although the processing of the email may be performed by gateway server 50, the present invention contemplates that the processing of the email may be performed by any other suitable component of enterprise network 42. For example, each enterprise computer 44 may include an application that operates to process the email to determine whether the email includes a valid authorization code before allowing a recipient at the enterprise computer 44 to access the email and/or the attachment. In particular embodiments, the processing of the email may be performed by the email application stored on and used by the particular enterprise computer 44. For example, when receiving an email with an attachment, the email application stored on and used by the particular enterprise computer 44 may operate as security software. Specifically, the email application may search the appropriate fields of the email or the attachment to determine whether a valid authorization code is associated with the email. Because such a determination may be made without the input of the user in some embodiments, the determination may be performed in a manner that is transparent to the addressed recipient using the particular enterprise computer 44. As such, the user need not know what the particular valid authorization code is that is associated with the email and may not even know of the use of such a code by email system 40.

Where the email application receiving the email determines that the email or attachments(s) lack the valid authorization code, the email application may assume that the email and/or the attachment is potentially harmful and restrict the recipient's access to the email and/or attachment. In particular embodiments, the email application may put a block on the attachment that prevents the recipient from opening the attachment. Thus, although the recipient may be prevented from accessing the attachment, the rest of the emailed communication may be accessible to the recipient.

Figure 3:
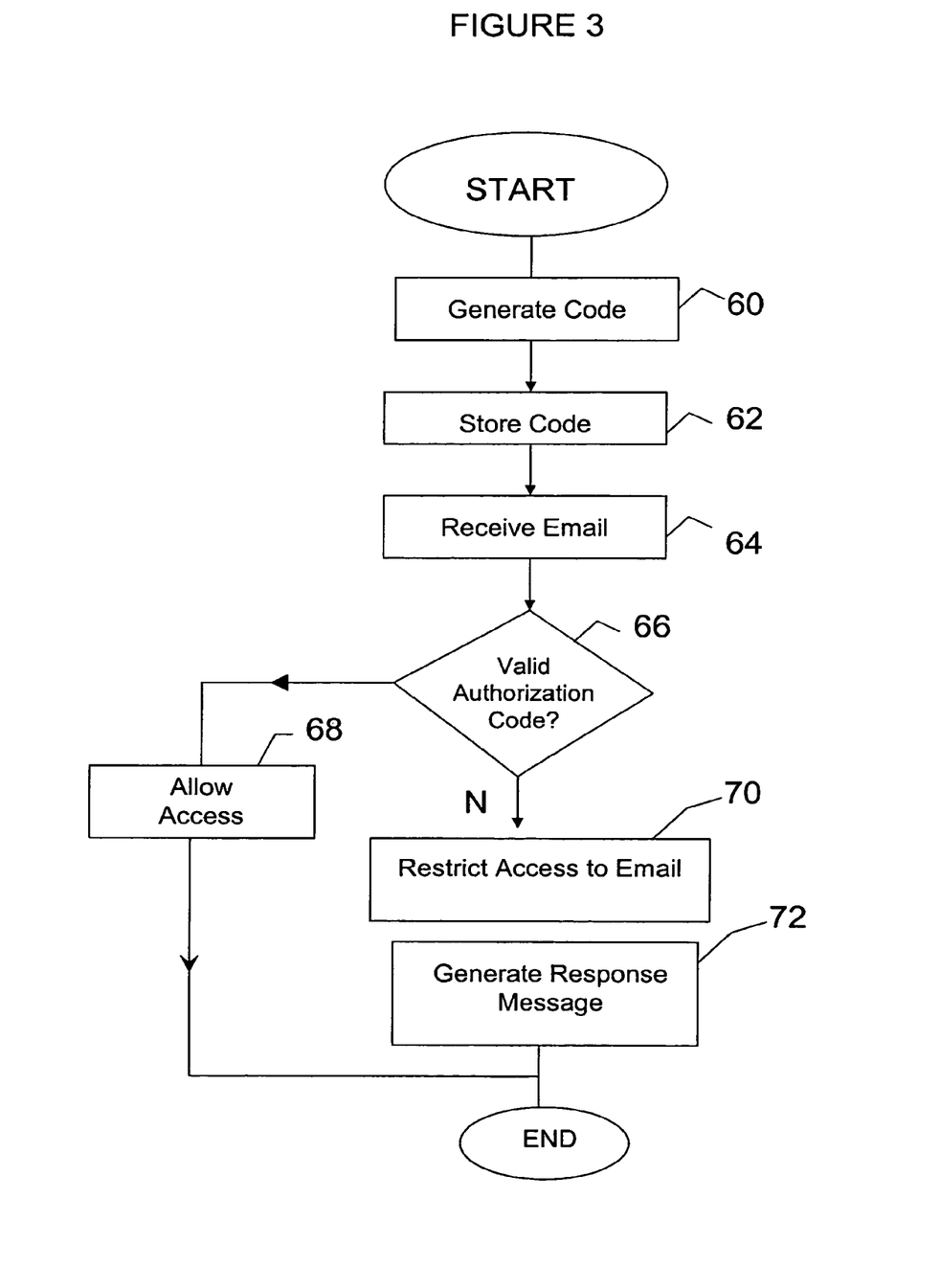
FIG. 3 illustrates a flow chart describing an example method for restricting user access to an email or attachment in accordance with the present invention.

FIG. 3 illustrates a flow chart describing an example method for restricting user access to an email or attachment in accordance with the present invention. The method described herein may be carried out using computer software, as can any or all of the processes described herein. That software may be executed by electronic mail gateway server 50, enterprise computer 44, external computer 52, general purpose computer 10, or any other computer or combination of computers.

In step 60, an authorization code is generated. Any of the options discussed above may be used for generation and storage of the authorization code. The authorization code is stored in step 62. The sender of an email may then access the authorization code and associate the authorization code with an email addressed to a recipient in enterprise network 42 to indicate to enterprise network 42 that the email is an authorized communication. The insertion of the authorization code into the email may be performed using any of the options discussed above.

In an optional step (not explicitly shown), an authorization code may be checked upon sending the email based on a code associated with the sender of the email. Steps like 66-72 may be included to authorize the sending of the email. The step analogous to step 68 would simply allow the email to continue. Any of the options discussed above could be used. In some embodiments, an authorization code for senders and recipients may be used and such codes could be the same or different in various embodiments.

In step 64, an email that is addressed to a recipient in enterprise network 42 is received at enterprise network 42. In particular embodiments, the email may include an attachment appended to the email. The email may be received at a gateway server 50 (or another server) that operates to process and route email traffic transmitted to or within enterprise network 42. In other embodiments, the email may be received at an enterprise computer 44 that is associated with the addressed recipient of the email.

The email may be processed by the component receiving the email in step 66 to determine whether a valid authorization code is associated with the email. To make such a determination, the email or an attachment to the email are searched (either in its entirety or in limited locations) for the valid authorization code as described above.

If it is determined at step 66 that a valid authorization code is associated with the email, access to the email is allowed in step 68. If it is determined at step 66 that a valid authorization code is not associated with the email, however, access to the email may be restricted at step 70. Any of the various methods for restriction discussed above may be used or other restrictions may be used without departing from the scope of the invention.

In step 72, a response message may be generated. In particular embodiments, the response message may convey to the sender of the email that the sender has sent an unauthorized communication to the enterprise network. Where appropriate, the response message may also notify the sender that the original email has been quarantined by gateway server 50 of enterprise network 42 or notify the sender that the addressed recipient received only a portion of the original email. The response message may further describe to the sender the steps required to obtain a valid authorization code. Any of the options for notification discussed above or other methods may be used. Alternatively, step 72 may be omitted in some embodiments.

Although the present invention has been described in detail, it should be understood that various changes, substitutions and alterations can be made hereto without departing from the sphere and scope of the invention as defined by the appended claims. For example, while the authorization may generally be done by client or server computers, it could also be done by other computers such as a router.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for restricting access to one or more email attachments, comprising:
   receiving an email addressed to a first recipient and including at least a first attachment;
   with a hardware processor, processing the email to determine whether a valid authorization code is associated with the email, wherein the valid authorization code indicates that an attachment is safe to be opened or executed by the first recipient and the processing includes:
   searching for an authorization code; and
   determining whether a found authorization code is valid; and
   wherein if processing of the email determines that no valid authorization code is associated with the email, then the attachment is stripped from the email and the email is communicated to the first recipient without the stripped attachment.

2. The method of claim 1, wherein preventing access to the first attachment comprises preventing the first recipient from opening the attachment.

3. The method of claim 1, wherein the processing of the email to determine whether a valid authorization code is associated with the email is performed by an electronic mail gateway server.

4. The method of claim 1, wherein the processing of the email to determine whether a valid authorization code is associated with the email is performed by an email client application.

5. The method of claim 1, wherein searching for an authorization code comprises searching for the authorization code in a file name associated with the attachment.

6. The method of claim 1, wherein searching for an authorization code comprises searching data associated with the attachment, the data not ordinarily visible to the first recipient or a sender of the email.

7. The method of claim 1, wherein searching for an authorization code comprises searching for the authorization code in a body of the email.

8. The method of claim 1, wherein searching for an authorization code comprises searching for the authorization code in a subject line of the email.

9. The method of claim 1, wherein searching for an authorization code comprises searching data associated with the email, the data not ordinarily visible to the first recipient or a sender of the email.

10. The method of claim 1, wherein preventing access to the first attachment comprises preventing the email from leaving a gateway operable to communicate the email to the first recipient.

11. The method of claim 1, wherein the valid authorization code is associated with a first enterprise network, the valid authorization code communicated to one or more additional enterprise networks external to the first enterprise network.

12. The method of claim 1, wherein at least a portion of the valid authorization code is associated with a first recipient so that only the first recipient is authorized to access the attachment.

13. The method of claim 1, wherein at least a portion of the valid authorization code is associated with a domain in an enterprise network, the domain associated with a plurality of recipients including the first recipient, and wherein the valid authorization code identifies the attachment as an authorized communication accessible to recipients within the domain.

14. The method of claim 1, wherein determining whether a found authorization code is valid comprises:
  comparing the found authorization code to at least one authorization code in a registry of authorization codes.

15. A system for restricting access to one or more unhealthy portions of an email, comprising:
  a computer comprising a hardware processor operable to receive an email addressed to a first recipient and including at least a first attachment, the email including a sender email address and an email address of the first recipient; and
  security software stored on the computer and operable to, with the hardware processor:
    process the email to determine whether a valid authorization code is associated with the email, wherein the valid authorization code indicates that an attachment is safe to be opened or executed by the first recipient, the valid authorization code associated with either the sender email address or the first recipient email address, and the process includes:
    search for an authorization code;
    determine whether a found authorization code is valid; and
  prevent access by the recipient to the first attachment by stripping the attachment from the email and communicating the email without the stripped attachment to the first recipient, if the processing of the email determined that no valid authorization code is associated with the email.

16. The system of claim 15, wherein the computer comprises an electronic mail gateway server, the security software stored on the electronic mail gateway server.

17. The system of claim 15, wherein:
  the computer comprises the first recipient's computer; and
  the security software processing the email to determine whether a valid authorization code is associated with the email comprises an email client application stored on the first recipient's computer.

18. The system of claim 15, wherein the security software is operable to search for an authorization code by searching for the authorization code in a file name associated with the attachment.

19. The system of claim 15, wherein the security software is operable to search for an authorization code by searching for the authorization code in a body of the email.

20. The system of claim 15, wherein the security software is operable to search for an authorization code by searching for the authorization code in a subject line of the email.

21. The system of claim 15, wherein the security software is operable to search for an authorization code by searching data associated with the email, the data not ordinarily visible to the first recipient or a sender of the email.

22. The system of claim 15, wherein the valid authorization code is associated with a first enterprise network, the valid authorization code communicated to one or more additional enterprise networks external to the first enterprise network.

23. The system of claim 15, wherein at least a portion of the valid authorization code is associated with a domain in an enterprise network, the domain associated with a plurality of recipients including the first recipient, and wherein the valid authorization code identifies the email as an authorized communication accessible to the recipients within the domain.

* * * * *